(12) United States Patent
Jang et al.

(10) Patent No.: US 10,897,294 B2
(45) Date of Patent: Jan. 19, 2021

(54) EFFICIENT RANK EXTRACTION METHOD IN MIMO RECEIVER AND APPARATUS THEREFOR

(71) Applicant: GCT Research, Inc., Seoul (KR)

(72) Inventors: Ji Ho Jang, Seoul (KR); In Seok Hwang, Seoul (KR); Tae Won Park, Dangjin-si (KR)

(73) Assignee: GCT RESEARCH, INC., Seoul (KR)

( * ) Notice: Subject to any disclaimer, the term of this patent is extended or adjusted under 35 U.S.C. 154(b) by 0 days.

(21) Appl. No.: 16/701,157

(22) Filed: Dec. 3, 2019

(65) Prior Publication Data
US 2020/0204232 A1   Jun. 25, 2020

(30) Foreign Application Priority Data

Dec. 19, 2018 (KR) .................. 10-2018-0165398

(51) Int. Cl.
*H04B 7/0456* (2017.01)
(52) U.S. Cl.
CPC .................. *H04B 7/0486* (2013.01)
(58) Field of Classification Search
CPC .................................................. H04B 7/0486
See application file for complete search history.

(56) References Cited

U.S. PATENT DOCUMENTS

| | | | |
|---|---|---|---|
| 9,553,646 B1 * | 1/2017 | Zhou | .................... H04B 7/0486 |
| 2006/0209975 A1 | 9/2006 | Jeong et al. | |
| 2007/0005749 A1 | 1/2007 | Sampath | |
| 2009/0067531 A1 | 3/2009 | Lee et al. | |
| 2010/0232525 A1 * | 9/2010 | Xia | ....................... H04B 7/0663 375/259 |
| 2011/0170427 A1 * | 7/2011 | Koivisto | .............. H04B 7/0413 370/252 |
| 2013/0044800 A1 * | 2/2013 | Ogawa | .............. H04L 25/03923 375/224 |
| 2013/0051490 A1 * | 2/2013 | Gupta | ................... H04L 1/0031 375/296 |
| 2014/0241450 A1 * | 8/2014 | Prasad | ................ H04B 7/0456 375/267 |

FOREIGN PATENT DOCUMENTS

| | | |
|---|---|---|
| KR | 10-2006-0068082 A | 6/2006 |
| KR | 10-2009-0045248 A | 5/2009 |
| KR | 10-1057613 | 8/2011 |

OTHER PUBLICATIONS

Office Action from Korean Intellectual Patent Office, dated May 6, 2020.

* cited by examiner

*Primary Examiner* — Syed Haider

(57) ABSTRACT

The present invention relate to a method of extracting an optimum rank without considering a precoding matrix indicator (PMI) in a multiple-input multiple-output (MIMO) receiver, the method including calculating a correlation matrix from a MIMO channel matrix between a base station antenna and an MIMO receiver antenna; obtaining an eigenvalue from the correlation matrix; calculating channel capacity for each rank on the basis of the obtained eigenvalue; and selecting a rank corresponding to a channel capacity having a maximum value among the calculated channel capacities for each rank as an optimum rank.

17 Claims, 14 Drawing Sheets

EFFICIENT RANK EXTRACTION METHOD IN MIMO RECEIVER AND APPARATUS THEREFOR

CROSS REFERENCE TO RELATED APPLICATION

The present application claims priority under 35 U.S.C. § 119 to Korean Patent Application No. 10-2018-0165398, filed on Dec. 19, 2018 in the Korean Intellectual Property Office, the disclosure of which is incorporated by reference herein in its entirety.

BACKGROUND OF THE INVENTION

Field of the Invention

The present invention relates to a method of efficiently extracting a rank for reporting radio channel status information including a rank in a multiple-input multiple-output (MIMO) receiver used in a wireless communication system using multiple antennas.

Description of the Related Art

Wireless communication systems, which are growing rapidly, provide not only voice services but also high-speed data services. For the purpose of such high-speed data services, frequency, which is a finite resource, must be used efficiently. To increase the frequency efficiency, operators are building multi-antenna systems, and such systems include 4th generation and 5th generation mobile communication systems such as LTE, LTE-ADVANCED, and 5G-NR.

In a multi-antenna system, the data rate may be increased by using the same frequency and the same time resource and transmitting data of multiple layers in parallel through multiple antennas. In transmitting data in parallel through multiple antennas, rank information provides prior information about how many layers of data can be transmitted simultaneously. The rank information analyzes the downlink radio channel environment in the UE or the MIMO receiver, determines a rank of the multi-antenna channel, and reports the same to the base station in a reverse channel. As the rank information becomes more accurate, the terminal can receive parallel data transmitted from the base station without error and achieve an optimum downlink data rate.

However, since the amount of calculation and the radio channel information that the terminal needs to collect in order to accurately calculate the rank are significant, the implementation complexity of the terminal is greatly increased. The reason is that the dimension of the MIMO channel matrix between the base station and the terminal increases according to the number of base station transmit antennas and the number of terminal receiving antennas, and accordingly, the required calculation amount increases exponentially. For example, since two or four base station antennas are used in 3GPP LTE RELEASE-9, six or 64 precoding matrix indicators (PMI) may be present in the MIMO channel according to the 3GPP LTE standard. Accordingly, optimum rank calculation is performed by calculating channel capacity when all possible PMIs were applied according to each rank candidate value, and then extracting the rank and PMI having the maximum channel capacity. However, in the 3GPP LTE RELEASE-10, since the base station has been extended to use eight antennas, and the number of parallel data layers that can be transmitted by the base station can be extended up to eight, the rank from one up to eight is possible. The corresponding number of PMIs is greatly increased to a total of 617, so that the amount of computations required to extract the rank and PMI having the maximum channel capacity using the possible rank candidates and combinations of PMIs is increased significantly to 10 times or higher compared to 3GPP RELEASE-9. In addition, since 3GPP RELEASE-15 and 5G-NR of a later version thereof, the base station is further extended to use 32 antennas so that the number of PMIs increases exponentially, thus there is a problem in that it is practically impossible to implement, using the current hardware technology, a method of finding the rank and PMI having the optimum channel capacity by combining all PMI combinations corresponding to each rank with the MIMO channel matrix.

In Korean Patent No. 10-1057613, a technique for extracting a rank using a tuned performance metric is known. This technique uses the Pm(k) mapping matrix to select a rank having a metric with the largest capacity for all possible PMI candidates and ranks, in which all PMI combinations are still used. Therefore, for systems such as 5G-NR, a technique that may be realistically implemented to efficiently find a rank that is close to optimum with simpler calculations has become important.

DOCUMENTS OF RELATED ART (Patent Document 0001) Korean Patent No. 10-1057613 B1

SUMMARY OF THE INVENTION

Accordingly, the present invention has been made keeping in mind the above problems occurring in the prior art, and an objective of the present invention is to provide a method of maximizing data transmission rate at a low cost and an apparatus therefor, by extracting a rank close to optimum with a small amount of calculation while reducing the amount of calculation required for rank calculation, in order to report radio channel state information including a rank at a MIMO receiver used in a wireless communication system using multiple antennas.

In order to achieve the objective, according to an embodiment of the present invention, there is provided a method of extracting an optimum rank without considering a precoding matrix indicator (PMI) in a multiple-input multiple-output (MIMO) receiver, the method including: calculating a correlation matrix from a MIMO channel matrix between a base station antenna and an MIMO receiver antenna; obtaining an eigenvalue from the correlation matrix; calculating channel capacities for each rank on the basis of the obtained eigenvalue; and selecting a rank corresponding to channel capacity having a maximum value among the calculated channel capacities for each rank as an optimum rank.

The calculating of the correlation matrix may include obtaining the correlation matrix for each unit-block including at least one subcarrier.

The calculating of the channel capacity may include calculating the channel capacity for each rank on a per unit-block basis.

The selecting of the rank may include summing the channel capacity for each rank on a per unit-block basis.

The unit-block may be one of a physical resource block (PRB), a subband composed of at least one PRB, and a narrowband composed of at least one PRB.

The calculating of the channel capacity may include mapping the eigenvalue differently for each layer according to each rank candidate value to calculate an upper limit of the channel capacity, and approximating the channel capacity for each rank using the upper limit.

The calculating of the channel capacity may include approximating the channel capacity for each rank by normalizing the eigenvalue to a total sum of the eigenvalues so that the eigenvalue is always maintained at the same ratio regardless of an automatic gain control (AGC) operation reference point.

The calculating of the channel capacity may include approximating the channel capacity for each rank using an optimization metric comparing the relative magnitudes of the channel capacity.

In addition, according to another embodiment of the present invention, there is provided a program stored on a computer-readable recording medium for executing the method described above.

In addition, according to another embodiment of the present invention, there is provided a computer-readable recording medium having recorded thereon program for executing the method described above.

In order to obtain the objective, according to another embodiment of the present invention, there is provided an MIMO receiver for extracting an optimum rank without considering a PMI, the receiver including: a correlation matrix calculator obtaining a correlation matrix from a MIMO channel matrix between a base station antenna and an MIMO receiver antenna; an eigenvalue decomposition unit obtaining an eigenvalue from the correlation matrix; a channel capacity calculator calculating channel capacities for each rank based on the obtained eigenvalue; and a rank selector configured to select a rank corresponding to channel capacity having a maximum value among the calculated channel capacities for each rank as an optimum rank, wherein MIMO channel state information including the selected optimum rank is generated and reported to the base station in uplink.

The correlation matrix calculator may obtain the correlation matrix for each unit-block including at least one sub-carrier.

The channel capacity calculator may calculate the channel capacity for each rank on a per unit-block basis.

The rank selector may sum the channel capacities for each rank on a per unit-block basis.

The unit-block may be one of a physical resource block (PRB), a subband composed of at least one PRB, and a narrowband composed of at least one PRB.

The channel capacity calculator may map the eigenvalue differently for each layer according to each rank candidate value to calculate an upper limit of the channel capacity, and approximating the channel capacity for each rank using the upper limit.

The channel capacity calculator may approximate the channel capacity for each rank by normalizing the eigenvalue to a total sum of the eigenvalues so that the eigenvalue is always maintained at the same ratio regardless of an automatic gain control (AGC) operation reference point.

The channel capacity calculator may approximate the channel capacity for each rank using an optimization metric comparing the relative magnitudes of the channel capacity.

An optimum PMI for generating the MIMO channel state information may be found by extracting the optimum rank without considering the PMI and substituting PMIs in a PMI set required only for the extracted optimum rank.

As described, according to the present invention, there is an advantage that it is possible to maximize data transmission rate at a low cost, since a rank close to optimum can be extracted by a simple calculation, by using MIMO channel matrix between the base station antenna and the terminal (MIMO receiver) antenna without considering PMI combination and approximating channel capacity on the basis of an eigenvalue obtained thorough eighevalue decomposition to extract the rank having the maximum channel capacity.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinafter, embodiments of the present invention will be described in detail with reference to the accompanying drawings so that those skilled in the art can easily carry out the present invention. In the following description, only portions necessary for understanding the operation according to the embodiment of the present invention are shown and described, and the description and the other portions of the drawings are omitted so as not to obscure the gist of the present invention. The present invention may, however, be embodied in many different forms and should not be construed as limited to the embodiments set forth herein.

It is also to be understood that the terms and words used in the following description and claims should not be construed as limited to ordinary or dictionary meanings and should be construed as having a meaning and concept consistent with the technical idea of the present invention so as to express the present invention most appropriately.

For simplicity of explanation, one or more methods are shown and described herein as a series of steps, for example in a form of a flowchart, but the invention is not limited by the order of the steps. It is because the present invention may be done in a different order than that shown and described herein in accordance with the present invention or concurrently with other steps. Moreover, not all illustrated steps must be implemented in accordance with the present invention.

It should be understood that the singular forms "a", "an", and "the" used herein include the plural expressions unless the context clearly dictates otherwise, and the term "comprising" and the like means that there is a feature, number, step, action, component, part, or combination thereof that is implemented, and the presence of one or more other features or numbers, step action components, parts, or a combination thereof or the possibility of adding the same is not excluded.

Prior to the detailed description of the drawings, it is to be clear that the division of the components in the present specification is only divided by the main function of each component. That is, two or more components to be described below may be combined into one component, or one component may be provided to be divided into two or more for each function. Each of the components to be described below may additionally perform some or all of the functions of other components in addition to the main functions of the components, as well as some of the main functions of each of the components may be carried out exclusively by other components.

Figure 1:
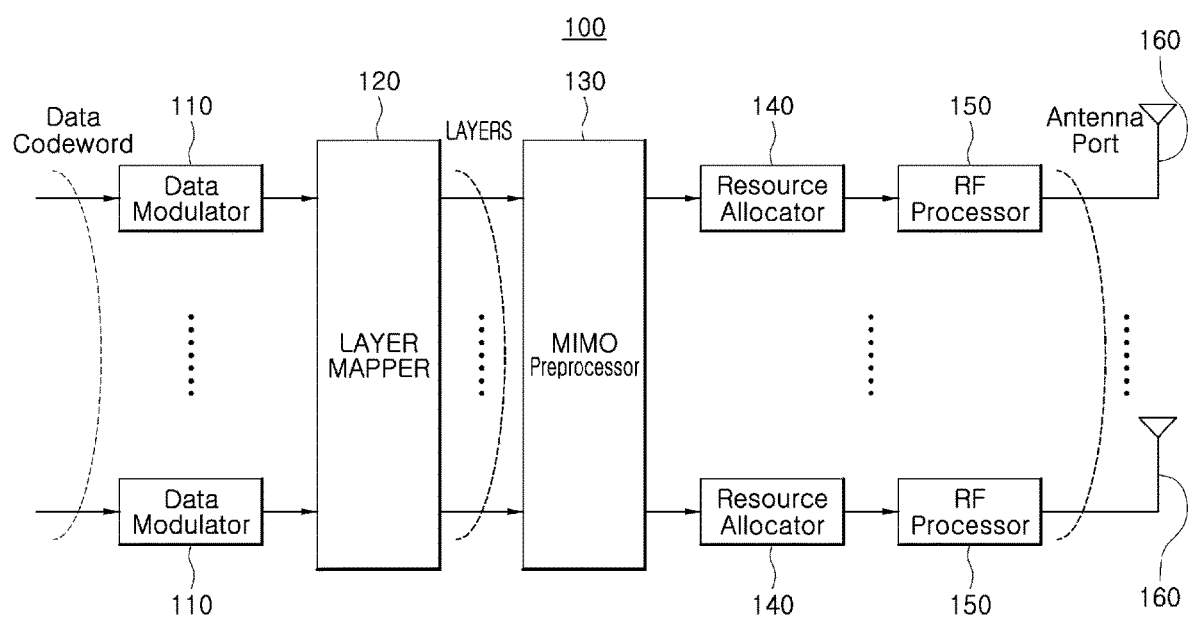
FIG. 1 is a block diagram illustrating a structure of a MIMO transmitter of a base station each having multiple antennas.
Figure 2:
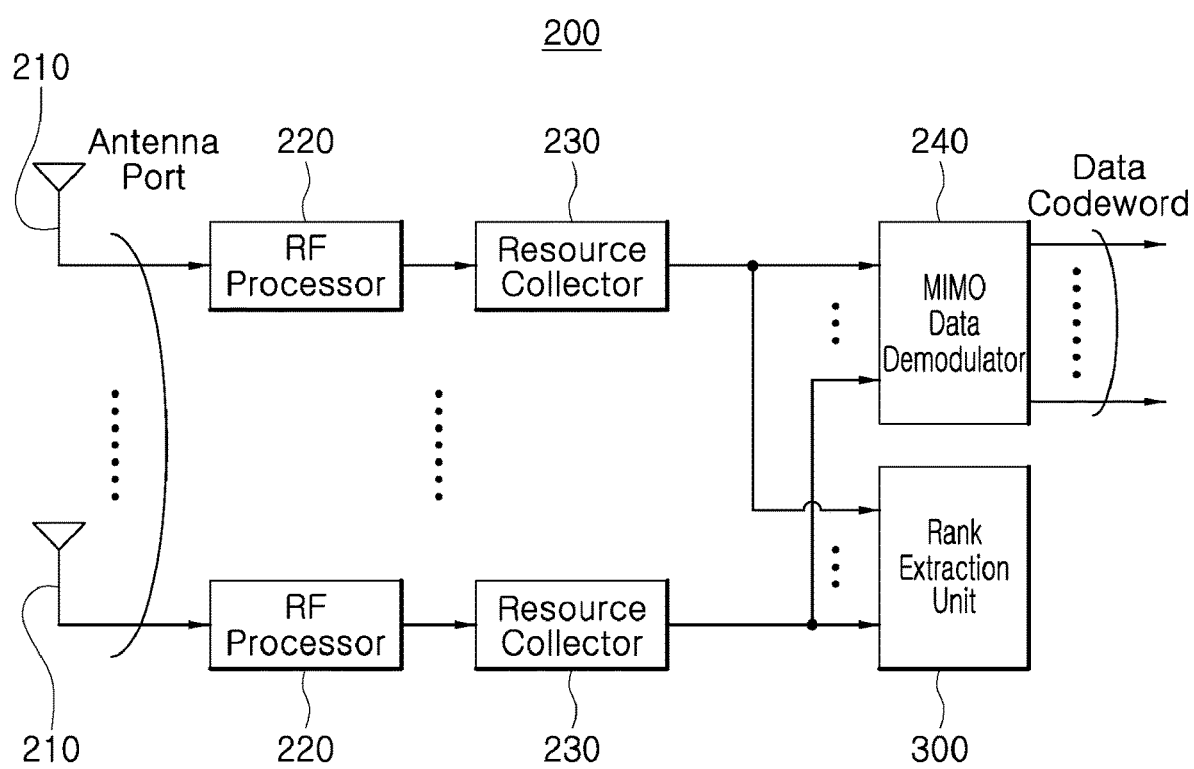
FIG. 2 is a block diagram illustrating a structure of a MIMO receiver of a UE.

FIGS. 1 and 2 are block diagrams illustrating a structure of a MIMO transmitter 100 of a base station each having multiple antennas and a MIMO receiver 200 of a UE, respectively.

Referring to FIG. 1, the MIMO transmitter 100 of the base station typically is configured so that multiple data codewords pass through data modulators 110 for each data codeword to be mapped to each layer through a layer mapper 120, and transmitted in parallel with multiple transmitting antenna ports, thereby increasing frequency efficiency. The number of data codewords and the number of layers do not necessarily need to match with each other, and typically, the number of layers is larger than the number of data codewords. The layer mapper 120 serves to map multiple data codewords to each MIMO layer. Thereafter, a MIMO preprocessor 130 is allowed to be operated as transmit diversity or spatial multiplexing, and perform transmission to an antenna port 160 through a resource allocator 140 and an RF processor 150 for each MIMO layer.

Referring to FIG. 2, signals received through multiple antenna ports 210 pass through an RF processor 220 and a resource collector 230 for each antenna to be transmitted to a MIMO data demodulator 240 or a rank extractor 300 according to types of signal resources. The MIMO data demodulator 240 receives the data signal resource and demodulates the actual meaningful data information. The cell specific reference signal or the channel status information reference signal is transmitted to the rank extractor 300, and the rank extractor 300 extracts the rank which is the most suitable for the channel environment, generates MIMO channel state information including the rank, and reports the same to the base station.

The present invention relates to a rank extractor 300. Referring to the rank extracting process in the related art, the channel capacity is calculated using the MIMO channel matrix between the base station antenna and the terminal antenna and all possible PMI combinations corresponding to each rank candidate value, and the PMI and rank which may have the maximum channel capacity are extracted.

For example, when a PMI is represented by a matrix W and a MIMO channel is represented by a matrix H, then a real channel matrix containing both PMI(W) and MIMO channel(H) can be labeled as HW. For all possible combinations of rank and PMI which are possible, a method of calculating the channel capacity of the real channel matrix and selecting the maximum channel capacity is shown in Equation 1.

[Equation 1]
$$\{RANK^*, PMI^*\} = \max_{\substack{\forall RANK\ set \\ \forall PMI\ set}} \{\text{Capacity of } HW_{for\ each\ RANK\ \&\ PMI}\}$$

In Equation 1, RANK*, PMI* are an optimum rank and a PMI value, respectively.

However, according to the method of <Equation 1>, as the 3GPP standard progresses, it is difficult to deal well with the required calculation amount due to the increase in the number of base station antennas and the number of parallel data layers, so it is increasingly difficult to be implemented in hardware in a modem chip. Therefore, there is a need for a method that makes it possible to calculate a rank that is close to optimum with the least amount of required computations in such a manner as to be actually implemented in hardware.

To this end, there is a technique for extracting the rank that is expected to have the highest channel capacity, by transforming the MIMO channel matrix into the upper or lower triangular matrix through a linear converter such as QR decomposition, and approximating the channel capacity by means of mean mutual information per bit (MMIB) method. However, there is a problem in that this method still requires a considerable amount of computations because it requires a process of calculating and comparing channel capacity for "all PMI combinations".

In order to solve the above problem, the present invention has devised a technical method using only the MIMO channel matrix "without consideration of PMI combination".

That is, it is possible to extract the rank that is close to optimum via a simple operation that approximates the channel capacity from an eigenvalue obtained through eigenvalue decomposition using only the MIMO channel matrix between the base station antenna and the terminal antenna without considering the PMI combination. The optimum PMI is extracted by extracting the rank first and then substituting PMIs in a PMI set required only for the corresponding rank.

As an embodiment of the present invention, a method of extracting the optimum PMI after extracting the optimum rank may be expressed as <Equation 2>.

[Equation 2]
$$RANK^* = \max_{\forall RANK\ set} \{\text{Capacity of } H_{for\ each\ RANK}\}$$

$$PMI^* = \max_{\forall PMI\ set} \{\text{Capacity of } HW_{for\ each\ PMI\ given\ RANK^*}\}$$

In <Equation 2>, RANK*,PMI* are an optimum rank and a PMI value, respectively.

As presented in <Equation 2>, through a "two-stage approach" that extracts the optimum rank and then extracts the optimum PMI, it is possible to significantly reduce an amount of computations since the calculation of the optimum rank can be performed independently of PMI.

In <Equation 2>, the channel capacity may be calculated with <Equation 3>, given the MIMO channel matrix H.

[Equation 3]

$$\text{Capacity} = \log_2 \det(1 + \gamma \cdot H^H H/N) = \sum_{n=1}^{N} \log_2(1 + \gamma \cdot \lambda_n / N)$$

$\gamma$: SNR (signal to noise ratio),
$\lambda_n$: $n^{th}$ eigen value (descending order) of $H^H H$, $\lambda_n \geq \lambda_{n+1}$
N: dimension of $H^H H$ <Eigenvalue-Based Rank Extraction Scheme>

In order to calculate the channel capacity using only the MIMO channel matrix "without consideration of PMI combination" as shown in <Equation 2>, the present invention has devised an "eigenvalue-based rank extraction scheme".

As an example, in <Equation 3>, assuming that a rank may be one of 1, 2, 3, and 4, as shown in <Equation 4>, "channel capacity for each of rank candidate values 1, 2, 3, and 4 based on eigenvalue" may be approximated simply. That is, since <Equation 3> does not include the "rank concept", the channel capacity equation for each rank is defined separately as shown in <Equation 4>.

[Equation 4]

$$\text{Capacity}_1 \approx \log_2\left(1 + 4 \cdot \gamma \cdot \frac{\lambda_1}{N}\right)$$

$$\text{Capacity}_2 \approx \sum_{n=1}^{2} \log_2\left(1 + 2 \cdot \gamma \cdot \frac{\lambda_n}{N}\right)$$

$$\text{Capacity}_3 \approx \log_2\left(1 + 2 \cdot \gamma \cdot \frac{\lambda_1}{N}\right) + \sum_{n=2}^{3} \log_2\left(1 + 1 \cdot \gamma \cdot \frac{\lambda_n}{N}\right)$$

$$\text{Capacity}_4 \approx \sum_{n=1}^{4} \log_2\left(1 + 1 \cdot \gamma \cdot \frac{\lambda_n}{N}\right)$$

In <Equation 4>, in the case of the channel capacity Capacity$_1$, for rank 1, it is regarded that one data codeword is capable of being transmitted only through one layer, and the number of eigenvalues of $H^H H$ is one and a value thereof is $4\lambda_1$. In the case of the channel capacity capacity$_2$ for rank 2, it is regarded that two data codewords are capable of being transmitted through two layers, and the number of eigenvalues of $H^H H$ is two and the values thereof are $2\lambda_1$ and $2\lambda_2$. Similarly, in the case of the channel capacity Capacity$_3$ for rank 3, it is regarded that two data codewords are capable of being transmitted through three layers, the number of eigenvalues of $H^H H$ is three and the values thereof are $2\lambda_1$, $\lambda_2$, and $\lambda_3$, and the eigenvalues are mapped to two data codewords $\{2\lambda_1\}$ and $\{\lambda_2, \lambda_3\}$. In the case of the channel capacity Capacity$_4$ for rank 4, it is regarded that two data codewords are capable of being transmitted through four layers, the number of eigenvalues of $H^H H$ is four and the values thereof are $\lambda_1$, $\lambda_2$, $\lambda_3$, and $\lambda_4$, and the eigenvalues are mapped to two data codewords $\{\lambda_1, \lambda_2\}$ and $\{\lambda_3, \lambda_4\}$.

The channel capacity that is approximated in Equation 4, may be actually regarded as an upper limit of the theoretical channel capacity, because it is calculated to be more favorable for low rank candidate values. That is, <Equation 4> calculates an upper limit of channel capacity by mapping eigenvalues differently for each layer according to each rank candidate value, and approximates channel capacity for each rank.

More specifically, when the dimension of $H^H H$ is four (i.e., N=4), there are four eigenvalues and these eigenvalues $\lambda_1$, $\lambda_2$, $\lambda_3$, and $\lambda_4$ are arranged (i.e., $\lambda_1 \geq \lambda_2 \geq \lambda_3 \geq \lambda_4$) in a descending order (indicated by $\lambda_n \geq \lambda_{n+1}$ in Equation 3). According to such a $\lambda_n$ relation and a characteristic that a $\log_2$ function is an increasing function, the theoretical channel capacity for rank 1 is $$C_1 = \log_2\left(1 + 1 \cdot \gamma \cdot \frac{\sum_{n=1}^{4} \lambda_n}{N}\right),$$

and $4\lambda_1 \geq \sum_{n=1}^{4} \lambda_n$, which results in $$\text{Capacity}_1 \approx \log_2\left(1 + 4 \cdot \gamma \cdot \frac{\lambda_1}{N}\right) \geq C_1.$$

When dividing $\lambda_1$, $\lambda_2$, $\lambda_3$, and $\lambda_4$ into two disjoint groups, since the theoretical channel capacity for rank 2 is the channel capacity having the maximum value when summing the channel capacities calculated in each group, $$C_2 = \max\left\{\log_2\left(1 + 1 \cdot \gamma \cdot \frac{\sum_{i \in A} \lambda_i}{N}\right) + \log_2\left(1 + 1 \cdot \gamma \cdot \frac{\sum_{i \in B} \lambda_i}{N}\right)\right\},$$

where $B = A^c$ and thus $\text{Capacity}_2 \approx \sum_{n=1}^{2} \log_2\left(1 + 2 \cdot \gamma \cdot \frac{\lambda_n}{N}\right) \geq C_2$ Similarly, when dividing $\lambda_1$, $\lambda_2$, $\lambda_3$, and $\lambda_4$ into three disjoint groups, since the theoretical channel capacity for rank 3 is the channel capacity having the maximum value when summing the channel capacities calculated in each group, $$C_3 = \max\left\{\log_2\left(1 + 1 \cdot \gamma \cdot \frac{\sum_{i \in A} \lambda_i}{N}\right) + \log_2\left(1 + 1 \cdot \gamma \cdot \frac{\sum_{i \in B} \lambda_i}{N}\right) + \log_2\left(1 + 1 \cdot \gamma \cdot \frac{\sum_{i \in C} \lambda_i}{N}\right)\right\}$$

where $A \cap B = \emptyset$, $C = (A \cup B)^C$, and thus $$\text{Capacity}_3 \approx \log_2\left(1 + 2 \cdot \gamma \cdot \frac{\lambda_1}{N}\right) + \sum_{n=2}^{3} \log_2\left(1 + 1 \cdot \gamma \cdot \frac{\lambda_n}{N}\right) \geq C_3.$$

Further, since the channel capacity for rank 4 is $$C_4 = \sum_{n=1}^{4} \log_2\left(1 + 1 \cdot \gamma \cdot \frac{\lambda_n}{N}\right),$$

$$\text{Capacity}_4 \approx \sum_{n=1}^{4} \log_2\left(1 + 1 \cdot \gamma \cdot \frac{\lambda_n}{N}\right) = C_4.$$

Therefore, <Equation 4> may be referred to as the upper limit of the channel capacity for each rank. In addition, it may be considered that the channel capacity Capacity$_1$, for rank 1, which is the lowest rank candidate value, is calculated to be larger than that of the theoretical channel capacity $C_1$, compared to Capacity$_2$, Capacity$_3$, or Capacity$_4$.

A rank may be selected by <Equation 5> using the channel capacity for each rank calculated by <Equation 4>.

$$\text{RANK} = \max_{i}(\text{Capacity}_i), \text{ where } i = 1, 2, 3, 4 \quad \text{[Equation 5]}$$

In other words, when the maximum value is selected from the channel capacities obtained from <Equation 4>, the rank of the corresponding channel capacity becomes the optimum rank.

On the other hand, considering the fixed-point implementation in the hardware implementation, the eigenvalue must be normalized to the fixed-point scale, and this normalization factor must be changed according to an automatic gain control (AGC) operation reference point. However, when the MIMO channel matrix H is defined as in <Equation 6>, the sum of eigenvalues is equal to the sum of squares of elements of each channel matrix, and thus may be represented as in <Equation 7>.

$$H = \begin{bmatrix} h_{1,1} & \cdots & h_{1,nTx} \\ \vdots & \ddots & \vdots \\ h_{nRx,1} & \cdots & h_{nRX,nTx} \end{bmatrix} \quad \text{[Equation 6]}$$

$$\sum_{n=1}^{N} \lambda_n = \sum_{r=1}^{nRx} \sum_{t=1}^{nTx} |h_{r,t}|^2 \quad \text{[Equation 7]}$$

AGC is referred to a process of multiplying the analog gain and the digital gain so that the signal level becomes constant when the signal received through RF/analog is applied to the digital modem block. When the AGC is operated, the digital modem may not distinguish the actual wireless channel components from total received signal. Therefore, the signal received from the digital modem should be normalized to the total power sum to cancel the effects of analog gain and digital gain applied by the AGC. Such normalization makes it possible to extract actual radio channel values and provide accurate channel capacity.

Therefore, as an aspect of the present invention, since a total sum of eigenvalues is same as a total sum of channel powers as shown in <Equation 7>, it is possible to perform normalization to the total sum of eigenvalues rather than the total sum of received signal powers, in this calculation process. In other words, when each eigenvalue is normalized to the total sum of eigenvalues, the channel capacity calculation provided in <Equation 4> may be transformed as shown in <Equation 8>, since the same ratio may always be maintained regardless of the AGC operation reference point in fixed-point implementation.

$$\text{Capacity}_1 \approx \log_2\left(1 + 4 \cdot \gamma \cdot \frac{\lambda_1}{M}\right) \quad \text{[Equation 8]}$$

$$\text{Capacity}_2 \approx \sum_{n=1}^{2} \log_2\left(1 + 2 \cdot \gamma \cdot \frac{\lambda_n}{M}\right)$$

$$\text{Capacity}_3 \approx \log_2\left(1 + 2 \cdot \gamma \cdot \frac{\lambda_1}{M}\right) + \sum_{n=2}^{3} \log_2\left(1 + 1 \cdot \gamma \cdot \frac{\lambda_n}{M}\right)$$

$$\text{Capacity}_4 \approx \sum_{n=1}^{4} \log_2\left(1 + 1 \cdot \gamma \cdot \frac{\lambda_n}{M}\right) \text{ where,}$$

$$M = \sum_{n=1}^{4} \lambda_n$$

Therefore, the optimum rank may be selected by <Equation 5> from the channel capacity for each rank calculated by <Equation 8>.

According to another embodiment of the present invention, in order to determine the rank, only a relative magnitude is important, rather than an absolute value of the channel capacity approximations obtained in Equation 8. Therefore, the log function may be removed from <Equation 8>, whereby the capacity for each rank may be expressed as a simplified metric as shown in <Equation 9>, and optimization index may be determined by introducing a parameter κ that is adjustable according to each channel and environmental conditions.

$$\text{Metric}_1 = \left(1 + 4 \cdot \gamma \cdot \frac{\lambda_1}{M} \cdot \kappa\right) \quad \text{[Equation 9]}$$

$$\text{Metric}_2 = \left(1 + 2 \cdot \gamma \cdot \frac{\lambda_1}{M} \cdot \kappa\right)\left(1 + 2 \cdot \gamma \cdot \frac{\lambda_2}{M} \cdot \kappa\right)$$

$$\text{Metric}_3 = \left(1 + 2 \cdot \gamma \cdot \frac{\lambda_1}{M} \cdot \kappa\right)\left(1 + \gamma \cdot \frac{\lambda_2}{M} \cdot \kappa\right)\left(1 + \gamma \cdot \frac{\lambda_3}{M} \cdot \kappa\right)$$

$$\text{Metric}_4 =$$

$$\left(1 + \gamma \cdot \frac{\lambda_1}{M} \cdot \kappa\right)\left(1 + \gamma \cdot \frac{\lambda_2}{M} \cdot \kappa\right)\left(1 + \gamma \cdot \frac{\lambda_3}{M} \cdot \kappa\right)\left(1 + \gamma \cdot \frac{\lambda_4}{M} \cdot \kappa\right)$$

where, κ is compensation factor for fading profile, $M = \sum_{n=1}^{4} \lambda_n$, $\lambda_n \geq \lambda_{n+1}$ It is possible to select a rank according to <Equation 10> from the metric for each rank calculated by <Equation 9>.

$$\text{RANK} = \max_{i}(\text{Metric}_i), \text{ where } i = 1, 2, 3, 4 \quad \text{[Equation 10]}$$

That is, when the maximum value is selected from the approximation metrics of each channel capacity obtained from <Equation 9>, the rank of the corresponding metric becomes the optimum rank.

As another embodiment of the present invention, the above-described rank selection is applied only to the embodiment of up to rank 4, calculation of higher rank is possible according to configuration of the communication system and operations of the actual base station and terminal. For example, a system of up to rank 8 or more may be implemented in a simple eigenvalue-based rank selection scheme similar to the above and is shown as in Equation 11.

$$\text{Metric}_1 = \left(1 + 8 \cdot \gamma \cdot \frac{\lambda_1}{M} \cdot \kappa\right)$$ [Equation 11]

$$\text{Metric}_2 = \left(1 + 4 \cdot \gamma \cdot \frac{\lambda_1}{M} \cdot \kappa\right)\left(1 + 4 \cdot \gamma \cdot \frac{\lambda_2}{M} \cdot \kappa\right)$$

$$\text{Metric}_3 =$$
$$\left(1 + 4 \cdot \gamma \cdot \frac{\lambda_1}{M} \cdot \kappa\right)\left(1 + 2 \cdot \gamma \cdot \frac{\lambda_2}{M} \cdot \kappa\right)\left(1 + 2 \cdot \gamma \cdot \frac{\lambda_3}{M} \cdot \kappa\right)$$

$$\text{Metric}_4 = \left(1 + 2 \cdot \gamma \cdot \frac{\lambda_1}{M} \cdot \kappa\right)\left(1 + 2 \cdot \gamma \cdot \frac{\lambda_2}{M} \cdot \kappa\right)$$
$$\left(1 + 2 \cdot \gamma \cdot \frac{\lambda_3}{M} \cdot \kappa\right)\left(1 + 2 \cdot \gamma \cdot \frac{\lambda_4}{M} \cdot \kappa\right)$$

$$\text{Metric}_5 = \left(1 + 2 \cdot \gamma \cdot \frac{\lambda_1}{M} \cdot \kappa\right)\left(1 + 2 \cdot \gamma \cdot \frac{\lambda_2}{M} \cdot \kappa\right)$$
$$\left(1 + 2 \cdot \gamma \cdot \frac{\lambda_3}{M} \cdot \kappa\right)\left(1 + \gamma \cdot \frac{\lambda_4}{M} \cdot \kappa\right)\left(1 + \gamma \cdot \frac{\lambda_5}{M} \cdot \kappa\right)$$

$$\text{Metric}_6 = \left(1 + 2 \cdot \gamma \cdot \frac{\lambda_1}{M} \cdot \kappa\right)\left(1 + 2 \cdot \gamma \cdot \frac{\lambda_2}{M} \cdot \kappa\right)\left(1 + \gamma \cdot \frac{\lambda_3}{M} \cdot \kappa\right)$$
$$\left(1 + \gamma \cdot \frac{\lambda_4}{M} \cdot \kappa\right)\left(1 + \gamma \cdot \frac{\lambda_5}{M} \cdot \kappa\right)\left(1 + \gamma \cdot \frac{\lambda_6}{M} \cdot \kappa\right)$$

$$\text{Metric}_7 = \left(1 + 2 \cdot \gamma \cdot \frac{\lambda_1}{M} \cdot \kappa\right)\left(1 + \gamma \cdot \frac{\lambda_2}{M} \cdot \kappa\right)$$
$$\left(1 + \gamma \cdot \frac{\lambda_3}{M} \cdot \kappa\right)\left(1 + \gamma \cdot \frac{\lambda_4}{M} \cdot \kappa\right)\left(1 + \gamma \cdot \frac{\lambda_5}{M} \cdot \kappa\right)$$
$$\left(1 + \gamma \cdot \frac{\lambda_6}{M} \cdot \kappa\right)\left(1 + \gamma \cdot \frac{\lambda_7}{M} \cdot \kappa\right)$$

$$\text{Metric}_8 = \left(1 + \gamma \cdot \frac{\lambda_1}{M} \cdot \kappa\right)\left(1 + \gamma \cdot \frac{\lambda_2}{M} \cdot \kappa\right)$$
$$\left(1 + \gamma \cdot \frac{\lambda_3}{M} \cdot \kappa\right)\left(1 + \gamma \cdot \frac{\lambda_4}{M} \cdot \kappa\right)\left(1 + \gamma \cdot \frac{\lambda_5}{M} \cdot \kappa\right)$$
$$\left(1 + \gamma \cdot \frac{\lambda_6}{M} \cdot \kappa\right)\left(1 + \gamma \cdot \frac{\lambda_7}{M} \cdot \kappa\right)\left(1 + \gamma \cdot \frac{\lambda_8}{M} \cdot \kappa\right)$$

where, $\kappa$ is compensation factor for fading profile, $$M = \sum_{n=1}^{8} \lambda_n, \lambda_n \geq \lambda_{n+1}.$$

It is possible to select a rank according to <Equation 12> from each rank-based metric calculated by <Equation 11>.

$$\text{RANK} = \max_i(\text{Metric}_i), \text{ where}$$ [Equation 12]
$$i = 1, 2, 3, 4, 5, 6, 7, 8.$$

That is, when the maximum value is selected from the approximation metrics of each channel capacity obtained from <Equation 11>, the rank of the corresponding metric becomes the optimum rank.

In the above-described embodiment, examples of up to rank 4 and rank 8 have been mentioned, but the present invention is not limited thereto.

On the other hand, in a system employing Orthogonal Frequency Division Multiplexing (OFDM) technology such as LTE, LTE-ADVANCED, or 5G-NR, channel capacity for each subcarrier should be calculated, and the channel capacities are summed and then converted into capacity of the entire system. In the eigenvalue-based rank calculation method according to the present invention, when eigenvalue is obtained for each subcarrier, a large amount of computation is required. In order to compensate for this, a plurality of subcarriers are combined into one unit block, a correlation matrix is obtained in each unit block, and then an eigenvalue is obtained through eigenvalue decomposition. Based on this, the representative channel capacity of each unit block is calculated, and the channel capacity of the entire system is obtained by summing the representative channel capacities of each unit block, thereby reducing the amount of computations.

The unit block may be a physical resource block (PRB) as defined in LTE, LTE-ADVANCED, 5G-NR, or the like, or may be a subband (SB) or narrowband (NB) consisting of multiple PRBs. For example, the correlation matrix in the j-th unit block may be calculated as shown in <Equation 13>.

$$R_j = E[H_j^H H_j] \approx \frac{1}{L \cdot K} \sum_{l=0}^{L-1} \sum_{k=0}^{K-1} H(l,k)_j^H H(l,k)_j$$ [Equation 13]

In <Equation 13>, $H_j$ denotes a MIMO channel matrix of the j-th unit block, and $R_j$ denotes a correlation matrix of the j-th unit block. E[•] denotes an ensemble average, and is replaced by an average value of available signal resources in a block for convenience. l,k denote time and frequency indexes of the signal resources in the unit block, respectively, and are L·K denote the total numbers of time and frequency resources in the unit block, respectively.

Therefore, the channel capacity Capacity$_i$ or optimization metric Metric$_i$ for each rank candidate value may be calculated as shown in <Equation 14>.

$$\text{Capacity}_i = \sum_{j=1}^{J} \text{Capacity}_{i,j}$$ [Equation 14]

$$\text{Metric}_i = \sum_{j=1}^{j} \text{Metric}_{i,j}$$

In <Equation 14>, i represents a rank candidate value, in which i=1, 2, 3, and 4 in the case of systems of up to rank 4, and i=1, 2, . . . , 8 in the case of systems of up to rank 8.

Hereinafter, the eigenvalue-based rank extraction method will be described with reference to the accompanying drawings.

FIGS. 3 to 8 are block diagrams showing a structure of a rank extractor 300 according to an embodiment of the present invention.

Figure 3:
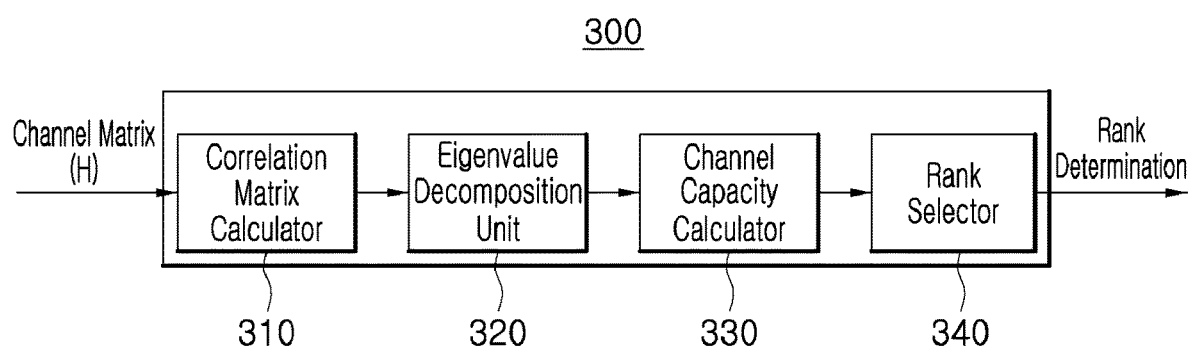
FIG. 3 is a block diagram illustrating a structure of a rank extractor according to an embodiment of the present invention.

Referring to FIG. 3, the rank extractor 300 used in the MIMO receiver 200 of FIG. 2 is illustrated. The rank extractor 300 may be configured to include a correlation matrix calculator 310, an eigenvalue decomposition unit 320, a channel capacity calculator 330, and a rank selector 340.

Figure 4:
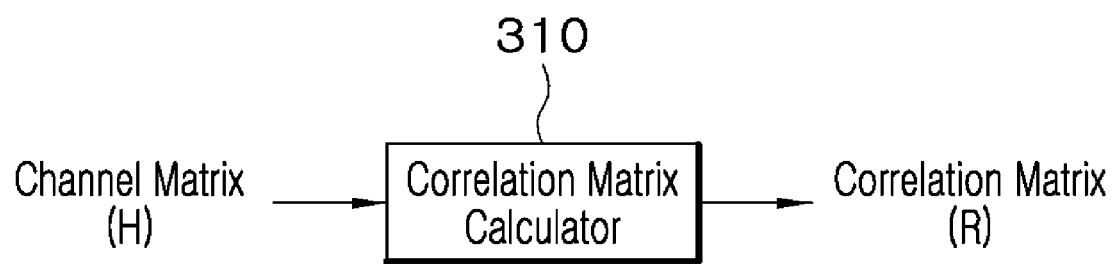
FIG. 4 is a block diagram illustrating a correlation matrix calculator of a rank extractor according to an embodiment of the present invention.

Referring to FIG. 4, the correlation matrix calculator 310 of the rank extractor 300 is illustrated. The correlation matrix calculator 310 obtains a correlation matrix R on the basis of the MIMO channel matrix H obtained through channel estimation in the MIMO receiver 200, in which the correlation matrix R may be calculated by using Equation 13.

Figure 5:
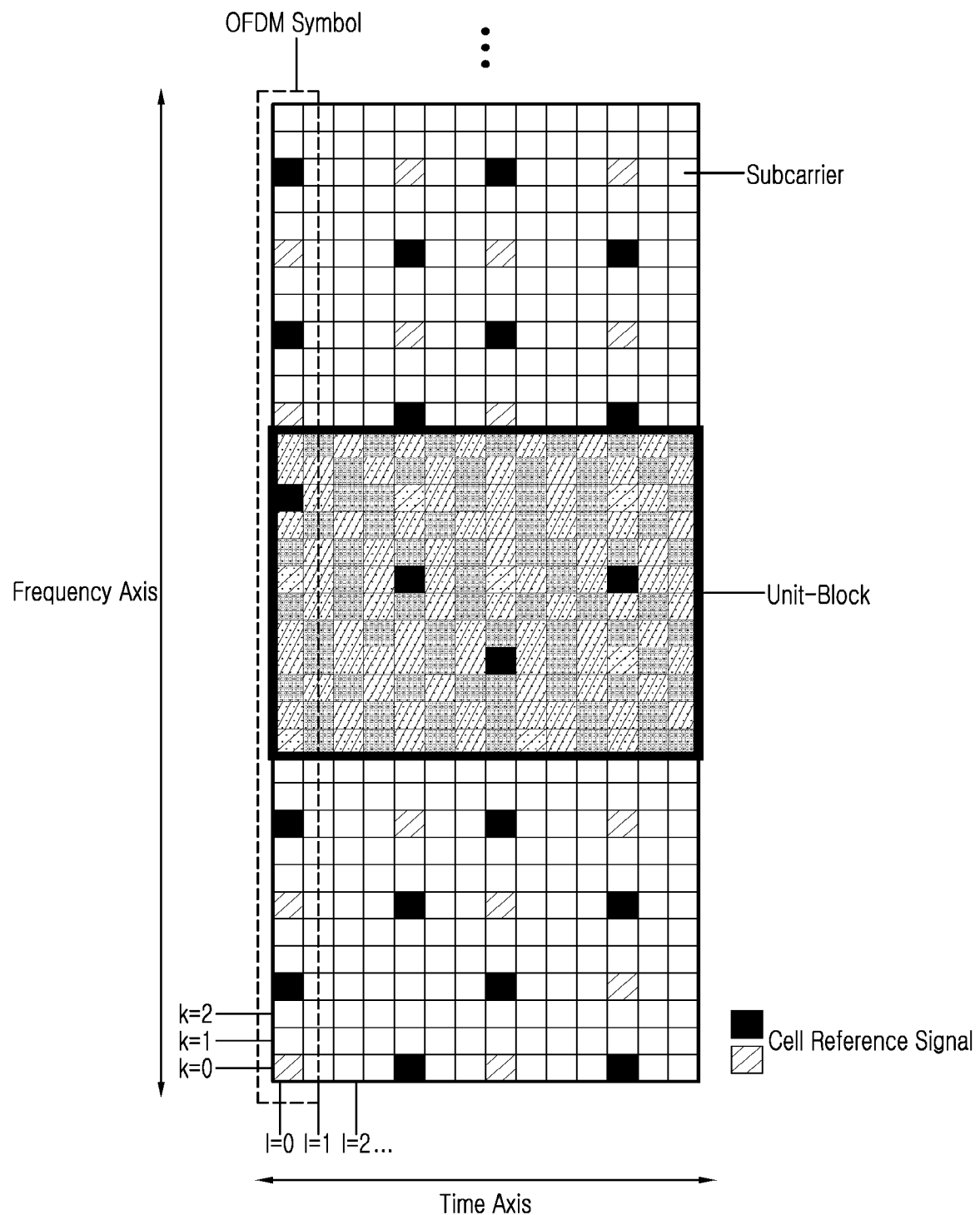
FIG. 5 is a block diagram illustrating a region of a unit block which obtains a correlation matrix according to an embodiment of the present invention.

The correlation matrix may be obtained for each unit block by using available time resources and frequency resources in each unit block, and the result may be transmitted to the eigenvalue decomposition unit 320. An example of a region of a unit block which obtains a correlation matrix in the correlation matrix calculator 310 is illustrated in FIG. 5.

Figure 6:
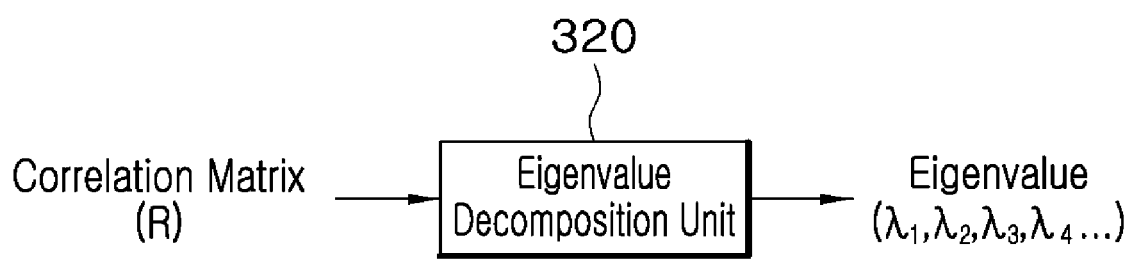
FIG. 6 is a block diagram illustrating an eigenvalue decomposition unit of the rank extractor according to an embodiment of the present invention.

FIG. 6 shows the eigenvalue decomposition unit 320 of the rank extractor 300, in which the eigenvalue decomposition unit 320 may obtain eigenvalues $\lambda_1, \lambda_2, \lambda_3, \lambda_4$, and . . . for each block correlation matrix R, which are received from the correlation matrix calculator 310.

Figure 7:
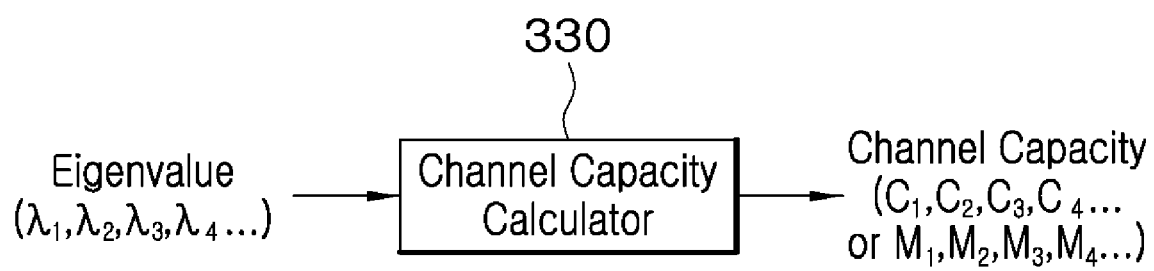
FIG. 7 is a block diagram illustrating a channel capacity calculator of a rank extractor according to an embodiment of the present invention.

FIG. 7 illustrates the channel capacity calculator 330 of the rank extractor 300. The channel capacity calculator 330 calculates an approximate channel capacity $C_i$ or Capacity$_i$ or channel capacity optimization metric $M_i$ or Metric$_i$ for each rank using eigenvalues $\lambda_1, \lambda_2, \lambda_3, \lambda_4$, and . . . , which are obtained from the eigenvalue decomposition unit 320.

For example, in order to calculate channel capacity for each rank, the channel capacity calculator 330 may:

(1) use <Equation 4> that is approximated by including the rank concept in <Equation 3>, which is the theoretical channel capacity calculation equation;

(2) use <Equation 8> to normalize each eigenvalue to the sum of eigenvalues so that it is possible to always maintain the same ratio regardless of the AGC operation reference point in fixed-point implementation; and (3) use <Equation 9> or <Equation 11>, which is a simplified channel capacity optimization metric calculation equation by eliminating the logarithmic function from the <Equation 8>, in order to compare only relative magnitudes rather than absolute values of the channel capacity approximation values.

Figure 8:
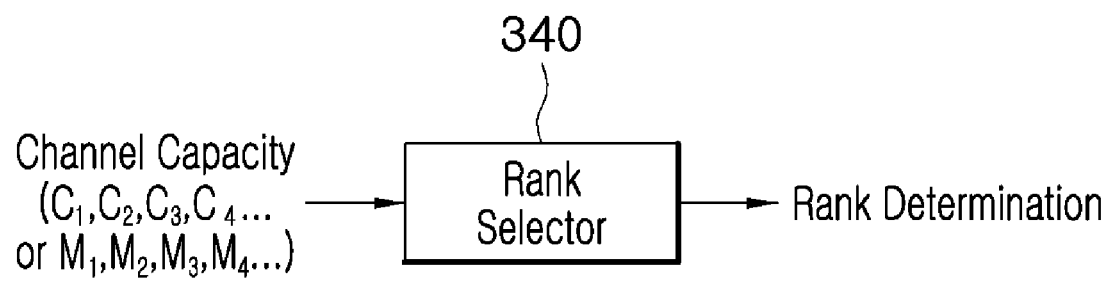
FIG. 8 is a block diagram illustrating a rank selector of a rank extractor according to an embodiment of the present invention.

FIG. 8 shows the rank selector 340 of the rank extractor 300. The rank selector 340 adds the channel capacity Ci or optimization index Mi calculated for each block to obtain channel capacity or optimization metric for the entire system, thereby making it possible to select a rank having the maximum channel capacity or optimization metric. Here, when selecting a rank, <Equation 5>, <Equation 10>, <Equation 12>, and the like may be used in order to calculate the channel capacity for each rank.

Figure 9:
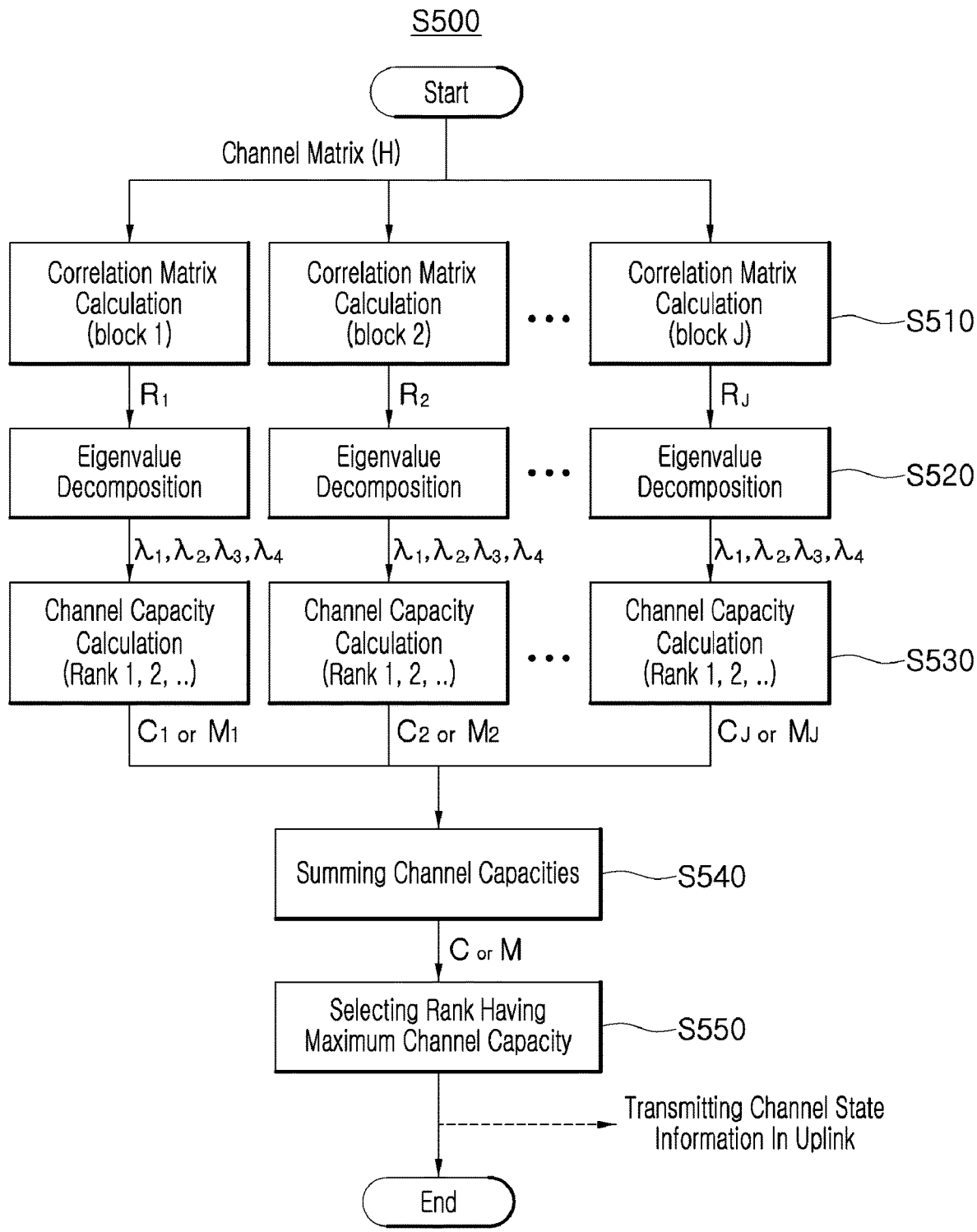
FIG. 9 is a flowchart illustrating a specific example of a rank extraction method according to an embodiment of the present invention.

FIG. 9 is a flowchart S500 illustrating a specific example of a rank extraction method according to an embodiment of the present invention.

Referring to FIG. 9, in step S510, a correlation matrix R is obtained on the basis of a MIMO channel matrix H obtained through channel estimation in the MIMO receiver 200, in which the correlation matrix may be calculated using <Equation 13>. Herein, the correlation matrix R may be obtained for each unit block by using available time resources and frequency resources in each unit block.

In step S520, eigenvalues $\lambda_1, \lambda_2, \lambda_3, \lambda_4$, and . . . may be obtained for each block correlation matrix R obtained in step S510.

In step S530, it is possible to calculate channel capacity $C_i$ or Capacity$_i$ or channel capacity optimization metric $M_i$ or Metric$_i$ that is approximated for each rank using eigenvalues $\lambda_1, \lambda_2, \lambda_3, \lambda_4$, and . . . , which are obtained in step S520. In this case, <Equation 4>, <Equation 8>, <Equation 9>, and <Equation 11> may be used.

In step S540, the channel capacity $C_i$ or optimization metric $M_i$ calculated for each block in step S530 is added to make the channel capacity or optimization metric for the entire system.

In step S550, a rank having the maximum channel capacity or optimization metric is selected from the channel capacity or optimization metric for the entire system, which is generated in the step S540. Here, when selecting a rank, <Equation 5>, <Equation 10>, <Equation 12>, and the like may be used in order to calculate the channel capacity for each rank.

After extracting the rank at step S550, the optimum PMI is extracted by substituting PMIs in a PMI set required for the corresponding rank. The MIMO channel state information including the rank is generated and reported to the base station in uplink.

Hereinafter, the suitability of the eigenvalue-based rank extraction method according to the present invention will be evaluated.

Figure 10:
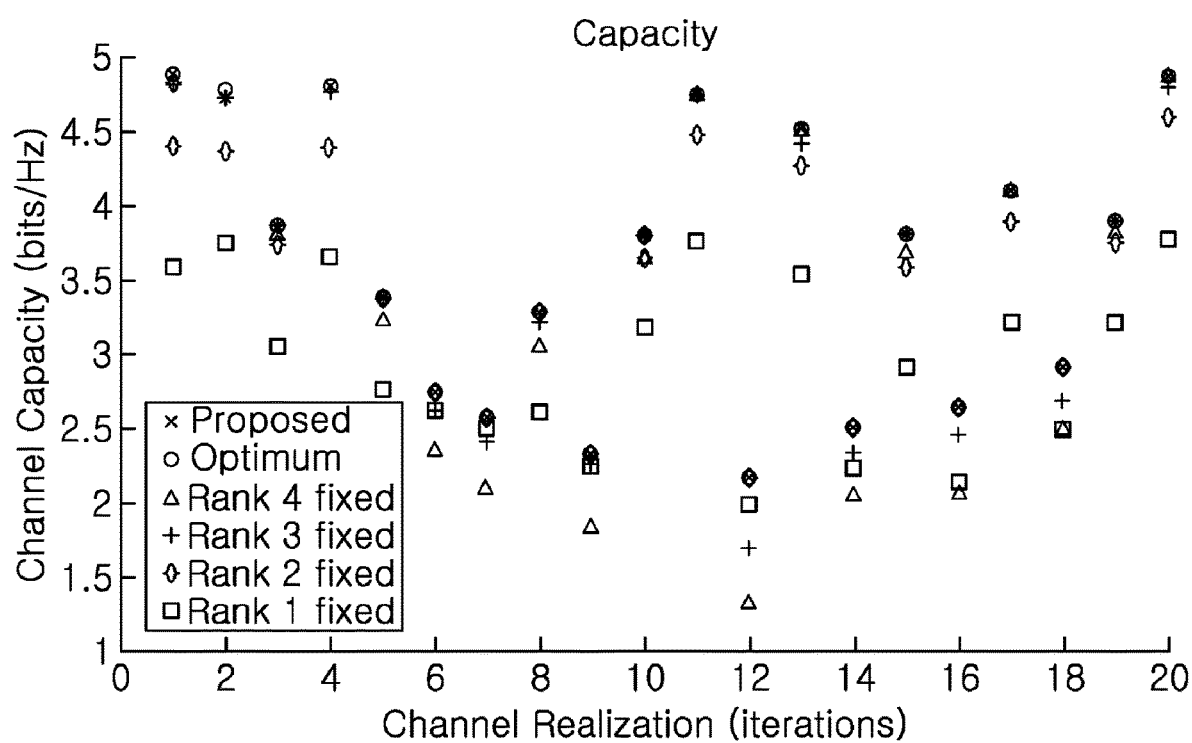
FIG. 10 is a graph illustrating a measurement result obtained by comparing channel capacities according to fixed rank operations and ranks extracted by an eigenvalue-based method according to an embodiment of the present invention and a full search method in the related art.

FIG. 10 is a graph illustrating a measurement result obtained by comparing channel capacities according to fixed rank operations and ranks extracted by an eigenvalue-based method according to an embodiment of the present invention and a full search method in the related art.

Referring to FIG. 10, it can be seen that the rank obtained according to the eigenvalue-based rank extraction method according to the present invention is very close to the optimum rank found by the full search method considering all ranks and the number of PMI combinations.

The full search method (shown as "Optimum" in the graph) which is a reference is performed by calculating channel capacity for all possible rank candidate values and all possible PMI candidate values (Equation 3), and selecting the rank representing the maximum channel capacity among them.

The horizontal axis of FIG. 10 represents 4×4 MIMO channel realizations performed 20 times. For each channel realization, the SNR uses a random value between 0 dB and 35 dB, and the channel correlation coefficient uses a random value between 0 and 0.1. In addition, when the ranks are fixed at the values 1, 2, 3, and 4 and operated, the channel capacities are also measured and shown.

Referring to the graph of FIG. 10, as a result of randomly generating Rayleigh fading channels and comparing channel capacities with respect to each channel occurrence for 20 times, it may be noted that the channel capacities calculated by the eigenvalue-based method according to the present invention is consistent with channel capacities calculated by the full search method for all 20 times.

FIGS. 11 to 14 are graphs showing results of comparing and measuring, under various conditions, data transmission rates according to fixed rank operations and ranks extracted by the eigenvalue-based method according to the present invention and the full search method in the related art.

Figure 11:
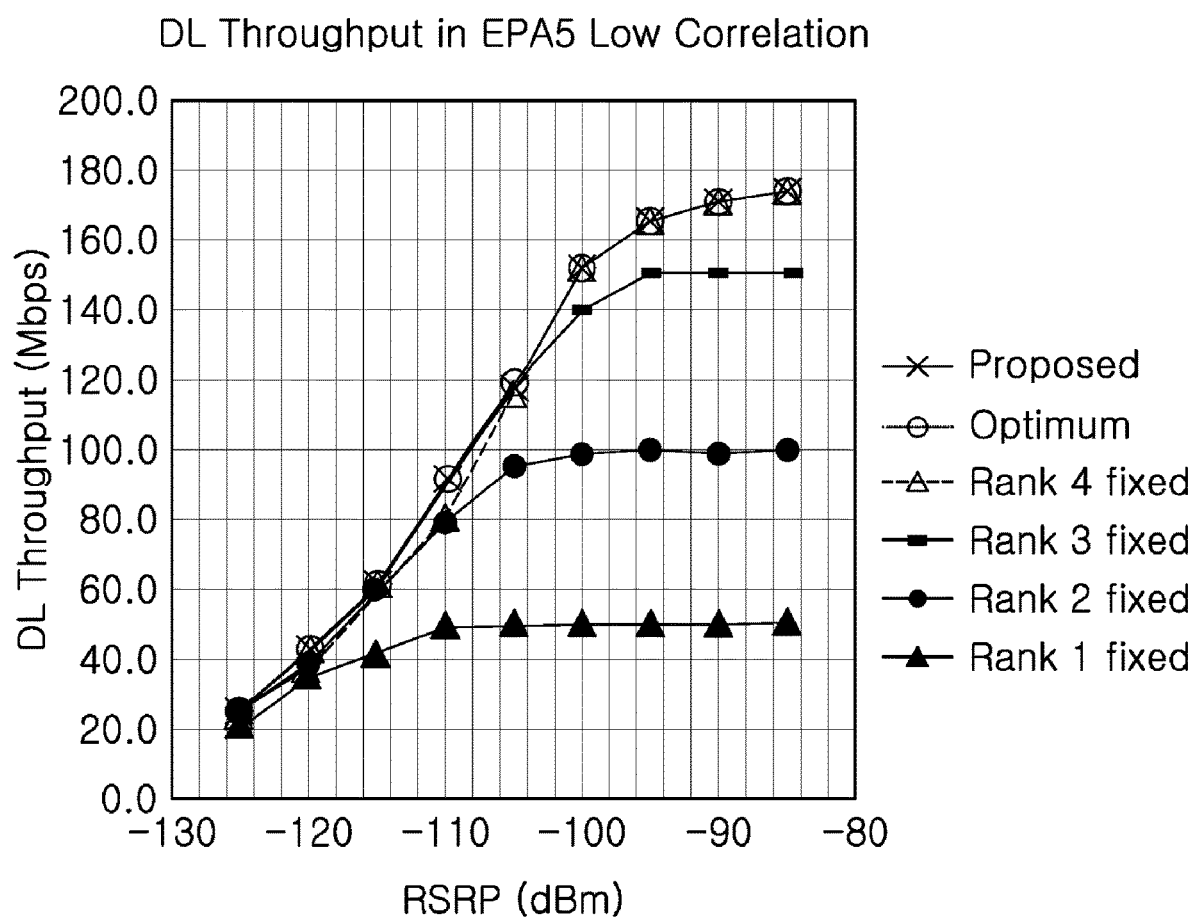
FIGS. 11 to 14 are graphs showing results of comparing and measuring, under various conditions, data transmission rates according to fixed rank operations and ranks extracted by the eigenvalue-based method according to the present invention and the full search method in the related art.
Figure 12:
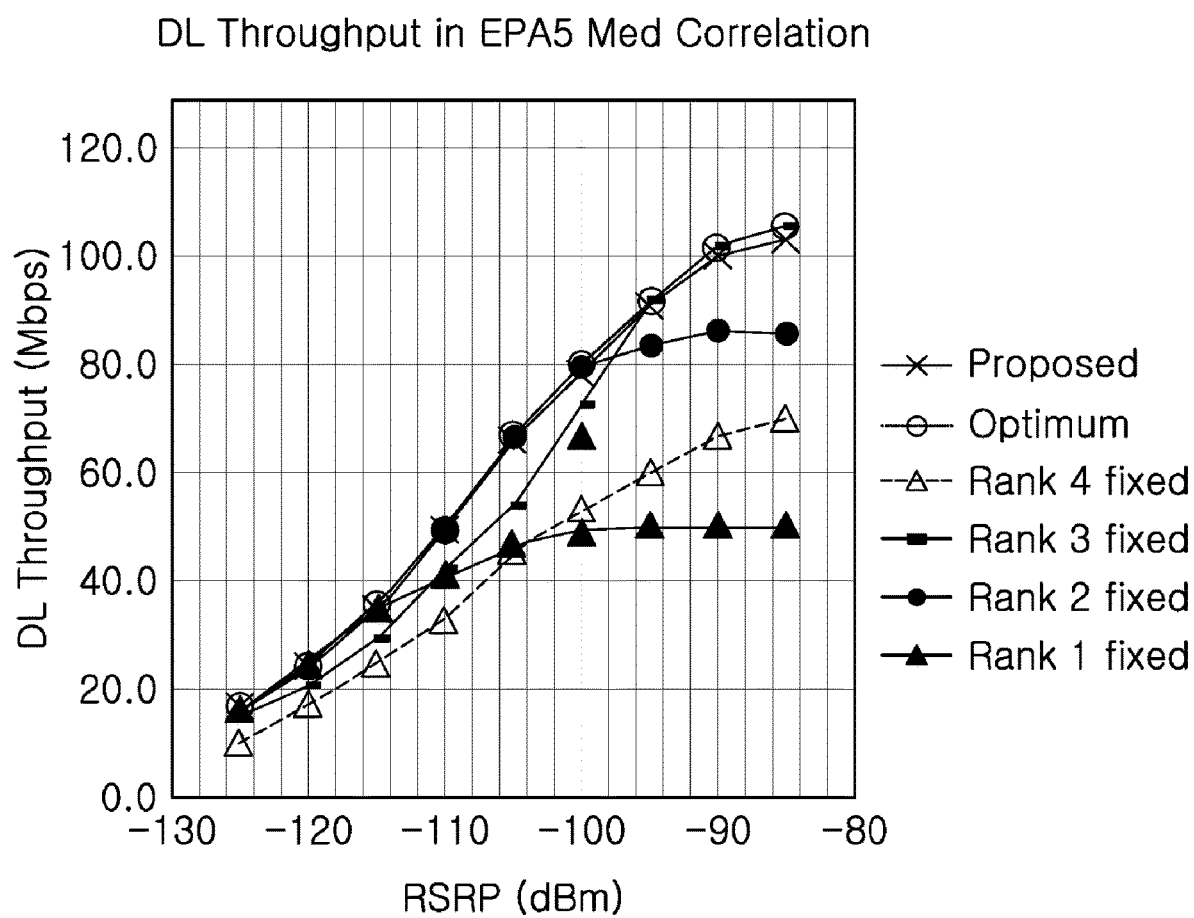
Figure 13:
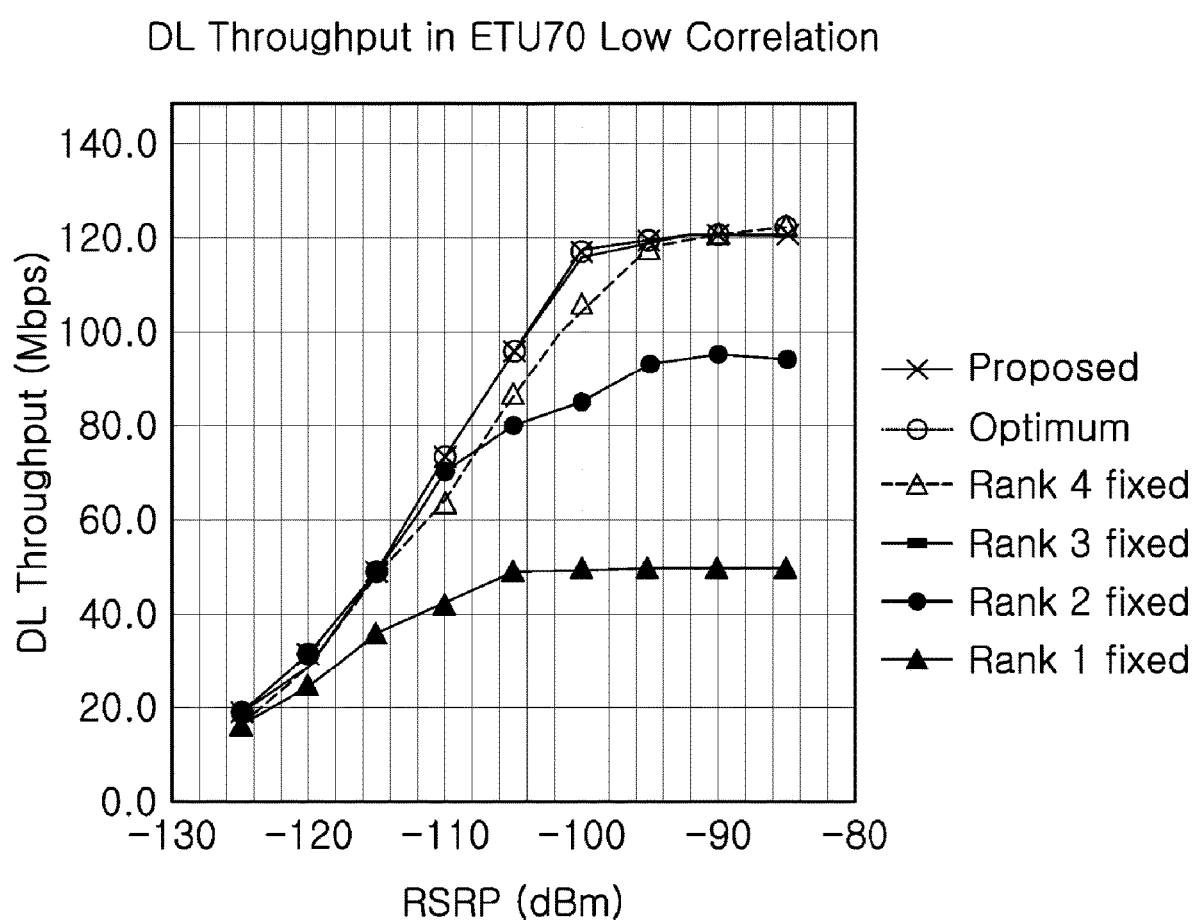
Figure 14:
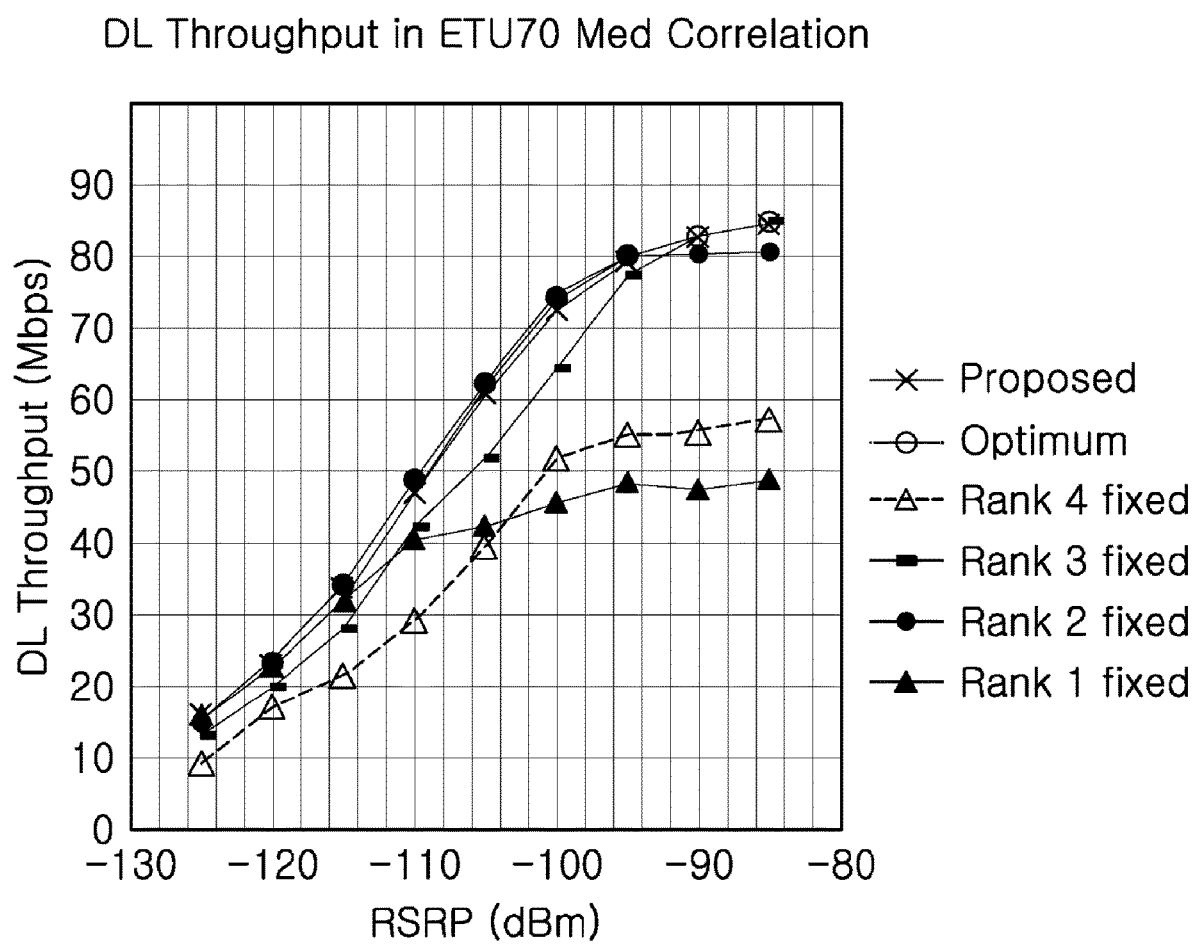

The measured experimental conditions are as follows.
3GPP LTE RELEASE-10
4×4 MIMO, TM3, 20 MHz BW
TDD configuration 2, Special subframe configuration 7
Commercial Base Stations, Commercial Terminals, Commercial Fading Generators
EPA5/ETU70, low correlation and medium correlation conditions
RSRP=−70 dBm~−125 dBm, 2 dB interval
Comparisons of downlink data rate measurements in cases of rank 1 fixed, rank 2 fixed, rank 3 fixed, and rank 4 fixed, downlink data rate measurement when extracting the optimum rank by the full search method, and downlink data rate measurement when using eigenvalue-based rank extraction method according to the present invention.
FIG. 11: EPA5 low correlation condition, κ=5
FIG. 12: EPA5 medium correlation condition, κ=12
FIG. 13: ETU70 low correlation condition, κ=10
FIG. 14: ETU70 medium correlation condition, κ=16

Considering measurement results of FIGS. 11 to 14, it may be seen that the eigenvalue-based rank extraction method has an equivalent data transmission rate when compared to the full search method, and the data transmission rate is much higher at all signal levels compared to the case of fixed operation at a specific rank such as ranks 1, 2, 3, and 4.

Meanwhile, Table 1 compares the computational complexity amount of the eigenvalue-based rank extraction method according to the present invention with the computational complexity amount of the full search method in the related art. As described above, all possible PMIs are applied for all possible ranks, and channel capacities are calculated and compared, thereby making it possible to select the PMI and the rank having the maximum channel capacity in the full search method. According to the present invention, only the rank is extracted first, and the optimum PMI is selected for the extracted rank without considering the PMI at all, whereby there is an effect that the computational complexity amount is significantly reduced as shown in Table 1.

TABLE 1

| | | The number of ranks | The number of PMIs | The number of channel capacity computation times | Comparison of computational complexity amount |
|---|---|---|---|---|---|
| Example 1 | Full search method | 4 | 64 | 256 | 100.0% |
| | Present invention | | | 68 | 26.6% |
| Example 2 | Full search method | 8 | 256 | 2048 | 100.0% |
| | Present invention | | | 264 | 12.9% |

As described above, according to the present embodiment, by using only the MIMO channel matrix between the base station antenna and the terminal (MIMO receiver) antenna without considering the PMI combinations, and approximating the channel capacity on the basis of the eigenvalue obtained through eigenvalue decomposition and extracting the rank having the maximum channel capacity, it is possible to extract a rank that is close to optimum through a simple computational complexity, and thus maximize data transmission rates at low cost.

In addition, the embodiment of the eigenvalue-based rank extraction method described above may be implemented in the form of computer program instructions that may be executed through various computer components. In addition, the implemented computer program may be recorded in a computer readable recording medium. The mentioned recording medium may be a ROM, a magnetic disk or a compact disk, an optical disk, or the like, but the present invention is not necessarily limited thereto.

While the present invention has been described with reference to exemplary embodiments, it is to be understood that the invention is not limited to the disclosed embodiments, but, on the contrary, is intended to cover various modifications and equivalent arrangements included within the spirit and scope of the appended claims. Accordingly, the true scope of the present invention should be determined by the technical idea of the appended claims.

The invention claimed is:

1. A method of extracting a rank without considering a precoding matrix indicator (PMI) in a multiple-input multiple-output (MIMO) receiver, the method comprising:
    calculating a plurality of correlation matrices from a plurality of MIMO channel matrices between a base station antenna and a MIMO receiver antenna;
    obtaining a plurality of eigenvalues from the plurality of correlation matrices;
    calculating a plurality of channel capacities for a plurality of rank candidate values on the basis of the plurality of eigenvalues; and
    selecting a rank candidate value corresponding to a maximum channel capacity among the plurality of channel capacities as the rank,
    wherein the calculating of the plurality of channel capacities comprises:
    calculating an upper limit of a channel capacity for each of the plurality of rank candidate values by mapping the eigenvalues differently for each layer; and
    approximating each of the plurality of channel capacities using the upper limit.

2. The method of claim 1,
    wherein the calculating of the correlation matrices includes obtaining a correlation matrix for each of a plurality of unit-blocks, each of the plurality of unit-blocks including at least one subcarrier.

3. The method of claim 2,
    wherein the calculating of the plurality of channel capacities includes calculating a channel capacity for each of the plurality of rank candidate values on a per unit-block basis.

4. The method of claim 2,
    wherein the selecting of the rank candidate value includes summing the plurality of channel capacities, each of the plurality of channel capacities being obtained for each of the plurality of rank candidate values on a per unit-block basis.

5. The method of claim 2,
    wherein each of the plurality of unit-blocks is one of a physical resource block (PRB), a subband composed of at least one PRB, and a narrowband composed of at least one PRB.

6. The method of claim 1,
    wherein the calculating of the plurality of channel capacities includes approximating a channel capacity for each rank by normalizing an eigenvalue therefor to a total sum of the plurality of eigenvalues so that the eigenvalue is maintained at the same ratio regardless of an automatic gain control (AGC) operation reference point.

7. The method of claim 1,
    wherein the calculating of the plurality of channel capacities includes approximating a channel capacity for each rank using an optimization metric comparing the relative magnitudes of the channel capacity.

8. A non-transitory computer-readable recording medium having recorded thereon program for executing a method extracting a rank without considering a precoding matrix indicator (PMI) in a multiple-input multiple-output (MIMO) receiver, the method including:
    calculating a plurality of correlation matrices from a plurality of MIMO channel matrices between a base station antenna and a MIMO receiver antenna;
    obtaining a plurality of eigenvalues from the plurality of correlation matrices;

calculating a plurality of channel capacities for a plurality of rank candidate values on the basis of the plurality of eigenvalues; and selecting a rank candidate value corresponding to a maximum channel capacity among the plurality of channel capacities as the rank, wherein the calculating of the plurality of channel capacities comprises:

calculating an upper limit of a channel capacity for each of the plurality of rank candidate values by mapping the eigenvalues differently for each layer; and approximating each of the plurality of channel capacities using the upper limit.

9. The non-transitory computer-readable recording medium of claim 8, wherein the calculating of the correlation matrices includes obtaining a correlation matrix for each of a plurality of unit-blocks, each of the plurality of unit-blocks including at least one subcarrier.

10. A MIMO receiver for extracting a rank without considering a PMI, the receiver comprising:

a plurality of antennas configured to receive a reference signal;

a rank extractor configured to:

obtain a plurality of correlation matrices from a plurality of MIMO channel matrices between a base station antenna of a base station and the antennas using the reference signal;

obtain a plurality of eigenvalues from the plurality of correlation matrices;

calculate a plurality of channel capacities for a plurality of rank candidate values on the plurality of eigenvalues; and select a rank candidate value corresponding to a maximum channel capacity among the plurality of channel capacities as the rank, wherein MIMO channel state information including the rank is generated and reported to the base station in uplink, and wherein the rank extractor is configured to:

calculate an upper limit of a channel capacity for each of the plurality of rank candidate values by mapping the eigenvalues differently for each layer; and approximate each of the plurality of channel capacities using the upper limit.

11. The receiver of claim 10, wherein the rank extractor is configured to obtain a correlation matrix for each of a plurality of unit-blocks, each of the plurality of unit-blocks including at least one subcarrier.

12. The receiver of claim 11, wherein the rank extractor is configured to calculate a channel capacity for each of the plurality of rank candidate values on a per unit-block basis.

13. The receiver of claim 11, wherein the rank extractor is configured to sum the plurality of channel capacities, each of the plurality of channel capacities being obtained for each of the plurality of rank candidate values on a per unit-block basis.

14. The receiver of claim 11, wherein each of the plurality of unit-blocks is one of a physical resource block (PRB), a subband composed of at least one PRB, and a narrowband composed of at least one PRB.

15. The receiver of claim 10, wherein the rank extractor is configured to approximate a channel capacity for each rank by normalizing an eigenvalue therefor to a total sum of the plurality of eigenvalues so that the eigenvalue is maintained at the same ratio regardless of an automatic gain control (AGC) operation reference point.

16. The receiver of claim 10, wherein the rank extractor is configured to approximate a channel capacity for each rank using an optimization metric comparing the relative magnitudes of the channel capacity.

17. The receiver of claim 10, wherein an optimum PMI for generating the MIMO channel state information is found by extracting the optimum rank without considering the PMI and substituting PMIs in a PMI set required only for the extracted optimum rank.

* * * * *